US006728566B1

(12) United States Patent
Subramanyan et al.

(10) Patent No.: US 6,728,566 B1
(45) Date of Patent: Apr. 27, 2004

(54) VESSEL TRACKING AND TREE EXTRACTION METHOD AND APPARATUS

(75) Inventors: Krishna Subramanyan, Solon, OH (US); Shalabh Chandra, Twinsburg, OH (US)

(73) Assignee: Koninklijke Philips Electronics, N.V., Eindhoven (NL)

( * ) Notice: Subject to any disclaimer, the term of this patent is extended or adjusted under 35 U.S.C. 154(b) by 229 days.

(21) Appl. No.: 09/990,521

(22) Filed: Nov. 21, 2001

(51) Int. Cl.$^7$ .............................................. A61B 5/05
(52) U.S. Cl. .................................................. 600/407
(58) Field of Search ............................ 600/407–471, 600/524; 378/15, 901, 8, 95; 128/897, 916; 382/131, 103, 285, 286, 265, 266

(56) References Cited

U.S. PATENT DOCUMENTS

| 5,699,799 A | 12/1997 | Xu et al. ................. 128/653.1 |
| 5,891,030 A | 4/1999 | Johnson et al. ............. 600/407 |
| 6,169,917 B1 | 1/2001 | Masotti et al. .............. 600/407 |

FOREIGN PATENT DOCUMENTS

| EP | 1 087 337 A1 | 3/2001 |
| FR | 2622991 | 5/1989 |
| WO | WO 01/26055 A2 | 4/2001 |
| WO | WO 01/37219 A1 | 5/2001 |

OTHER PUBLICATIONS

Huang, et al. "Model–Based Automatic Recognition of Blood Vessels From MR Images and Its 3D Visualization", ICIP, Nov. 13–16, 1994; IEEE Comp. Soc. Press V. 3, Conf. 1, Nov. 13, 1994 pp. 691–695 XP010146376.

Noordmans, et al. "High Accuracy Tracking of 2D/3D Curved Line–Structures by Consecutive Cross–Section Matching", Pattern Recognition Letters, vol. 19, No. 5, pp. 97–111, 1998.

Prinet, et al. "Vessels Representation in 2D and 3D Angiograms", CAR '97 Computer Assisted Radiology and Surgery, Lemke, et al., Elsevier Science, pp. 240–245, 1997.

Wink, et al. "Fast Delineation and Visualization of Vessels in 3–D Angiographic Images", IEEE Trans. Med. Imag, vol. 19, No. 4, pp 337–346,2000.

Stein, et al. "Tracing of Thin Tubular Structures in Computer Tomographic Data", Computer Aided Surgery, vol. 3, pp. 83–88, 1998.

Hernandez–Hoyos, et al. "A Deformable Vessel Model with Single Point Initialization for Segmentation, Quantification and Visualization of Blood Vessels in 3D MRA", MICCAI '00, Pittsburgh, pp. 735–745, 2000.

Sun, "Automated Identification of Vessel Contours in Coronary Arteriograms By an Adaptive Tracking Algorithm", IEEE Trans. Med. Imaging, vol. 8, No. 1 pp. 78–88, 1989.

Lindeberg, "Feature Detection with Automatic Scale Selection", Int. J. Computer Vision, vol. 30, No. 2, pp. 79–116, 1998.

*Primary Examiner*—Ali M. Imam
(74) *Attorney, Agent, or Firm*—Fay, Sharpe, Fagan, Minnich & McKee, LLP

(57) ABSTRACT

Computed tomography (CT) data (28) is collected for a plurality of slices by a CT scanner (10). At least a portion of the CT data is reconstructed (32) to form a volume image (34) defined by a plurality of two-dimensional image slices. At least one starting point is identified (72) within a blood vessel imaged in the three-dimensional image volume (34). The blood vessel is recursively tracked (70) to form a blood vessel representation (92).

18 Claims, 7 Drawing Sheets

VESSEL TRACKING AND TREE EXTRACTION METHOD AND APPARATUS

BACKGROUND OF THE INVENTION

The present invention relates to the medical imaging arts. It particularly relates to the imaging and interpretation vascular structures imaged in three-dimensional medical images, such as multi-slice or spiral computed tomography (CT) images, and will be described with particular reference thereto. However, the invention will also find application in conjunction with other imaging techniques such as magnetic resonance-based imaging (MRI) or nuclear medicine, as well as in interpretation of other tortuous and/or furcating tubular structures having constant or variable diameters.

Based upon current and future trends in CT technology, cardiac imaging, and in particular coronary artery imaging, is an increasingly important application in which CT is expected to play a significant role. Coronary arteries supply blood feeding the heart muscle. Failure of a coronary artery can produces myocardial infarction leading to chronic heart problems and/or catastrophic heart attacks, which are a leading cause of death in the United States today.

On the data acquisition side, development of multi-slice CT systems having increasingly improved resolution particularly in the slice-direction are making clinical CT imaging of vascular systems attractive. However, for CT to gain greater clinical acceptance in this area, reconstruction and post-processing of the images at selected phase(s) of the cardiac cycle should be automated to the greatest extent possible. Currently, coronary artery tracking in multi-slice CT data is a cumbersome and laborious task. Prior art vessel tracking systems are typically not directed toward CT data, which has peculiar issues such as high noise levels when compared with techniques such as magnetic resonance imaging (MRI). Past vessel tracking systems which are directed toward multi-slice CT are limited by long computation times.

The present invention contemplates an improved vessel tracking method and apparatus which overcomes the aforementioned limitations and others.

SUMMARY OF THE INVENTION

According to one aspect of the invention, a method for tracking a blood vessel in a three-dimensional image is disclosed. An estimated vessel center is identified corresponding to a starting point lying within a vessel to be tracked. A vessel direction is estimated in the vicinity of the starting point. A planar image is extracted containing the estimated vessel center from the three-dimensional image, which planar image is perpendicular to the estimated vessel direction. The planar image is edge-enhanced. A corrected vessel center is located in the planar image. Vessel boundaries are found in the planar image. A new estimated vessel center is extrapolated along the vessel direction. The estimating, extracting, edge-enhancing, locating, finding, and extrapolating steps are repeated to track the vessel.

According to another aspect of the invention, a medical imaging method is disclosed. Computed tomography (CT) data is collected for a plurality of slices. At least a portion of the CT data is reconstructed to form a volume image defined by a plurality of two-dimensional image slices. At least one starting point is identified within a blood vessel imaged in the three-dimensional image volume. The blood vessel is recursively tracked to form a blood vessel representation.

According to yet another aspect of the invention, an apparatus for tracking one of a blood vessel and a tubular organ in a patient is disclosed. A computed tomography scanner acquires three-dimensional image data. A reconstruction processor reconstructs the three-dimensional image data into a three-dimensional image representation. A tracking processor tracks the blood vessel in the three-dimensional image representation.

According to still yet another aspect of the invention, an apparatus for tracking one of a blood vessel and a tubular organ in a patient is disclosed. A computed tomography scanner acquires three-dimensional image data. A reconstruction processor reconstructs the three-dimensional image data into a three-dimensional image representation. A means is provided for estimating a vessel direction at a user selected starting point. A means is provided for extracting an image plane orthogonal to the vessel direction and containing the starting point. A means is provided for determining at least one of a vessel center and vessel edges in the image plane. A means is provided for identifying a new point based on the estimated vessel direction. A means is provided for the estimating, extracting, determining, and identifying being repeated a plurality of times to effectuate the tracking.

One advantage of the present invention is that it provides a direct approach for extracting the vessel centerline in multi-slice CT data.

Another advantage of the present invention is that it automatically extracts the vessel boundaries to provide accurate lumen information in the tracked vasculature.

Another advantage of the present invention is that it detects vessel branches. This facilitates generation of the vascular tree structure by successive applications of the vessel tracking.

Yet another advantage of the present invention is that it assesses the optimal phase in retrospective cardiac gating.

Numerous additional advantages and benefits of the present invention will become apparent to those of ordinary skill in the art upon reading the following detailed description of the preferred embodiments.

BRIEF DESCRIPTION OF THE DRAWINGS

The invention may take form in various components and arrangements of components, and in various steps and arrangements of steps. The drawings are only for the purpose of illustrating preferred embodiments and are not to be construed as limiting the invention.

DETAILED DESCRIPTION OF THE PREFERRED EMBODIMENTS

Figure 1:
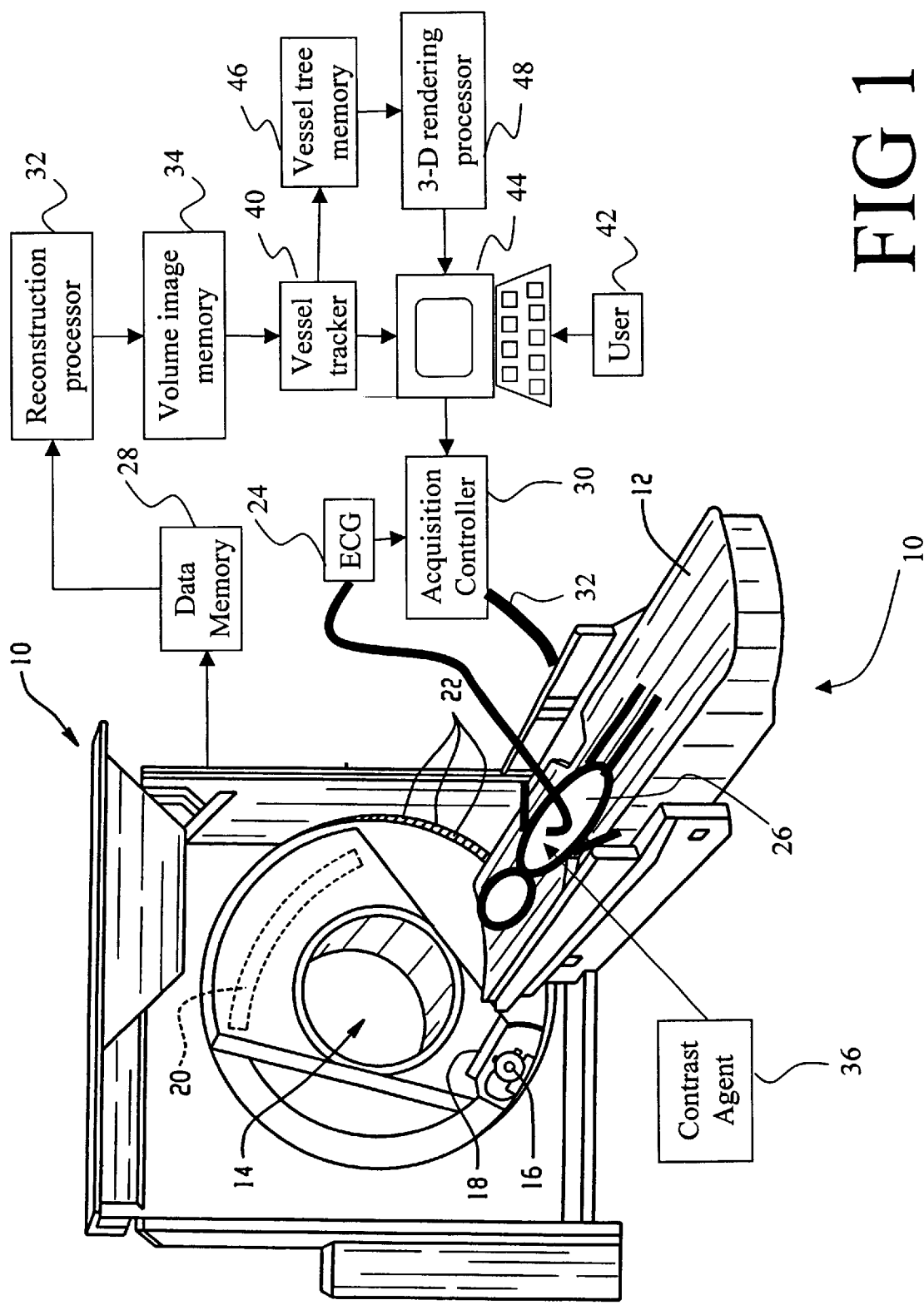
FIG. 1 schematically shows an exemplary multiple-slice CT imaging system that suitably practices an embodiment of the invention.

With reference to FIG. 1, a multiple-slice computed tomography (CT) scanner 10 includes a patient support 12 such as a patient bed which is linearly movable inside an examination region 14. An x-ray tube assembly 16 mounted on a rotating gantry projects a cone beam or a plurality of parallel fan beams of radiation through the examination region 14. A collimator 18 collimates the radiation beam or beams in two dimensions. In third generation scanners, a two-dimensional x-ray detector 20 is disposed on the rotating gantry across the examination region from the x-ray tube. In fourth generation scanners, an array of two-dimensional detector rings 22 is mounted on a stationary gantry around the rotating gantry.

Whether third or fourth generation, the x-ray detectors 20, 22 operate in known ways to convert x-rays that have traversed the examination region 14 into electrical signals indicative of x-ray absorption between the x-ray tube 16 and the detectors 20, 22. An electrocardiogram 24 monitors phases of a cardiac cycle of a patient 26. The x-ray absorption signals, along with information on the angular position of the rotating gantry and the cardiac phase, are communicated to a data memory 28.

An acquisition controller 30 communicates 32 with the CT scanner 10 to control CT scanning of a patient 26. The data corresponding to an operator-selected cardiac phase is reconstructed by a reconstruction processor 32 which reconstructs the selected cardiac phase x-ray absorption data into a plurality of CT image slices stored in a CT volume image memory 34. The reconstruction processor 32 operates using the filtered back-projection technique known to the art or using other reconstruction techniques.

In another suitable embodiment (not shown), the patient couch advances continuously such that the data acquisition occurs over a spiral geometry. The resulting spiral data is reconstructed into a three-dimensional image again stored in image memory 34. Those skilled in the art will also recognize that the invention is not limited to CT, but is also applicable to magnetic resonance imaging (MRI) and other methods capable of three-dimensionally imaging tubular biological structures.

For coronary artery imaging, the x-ray absorption data are advantageously sorted by cardiac cycle phase so that the slices do not encounter registration errors across image slices or motion artifacts within the slices due to the motion of the heart. Additionally, in order to emphasize the vasculature, a contrast agent 36, such as an iodine-based contrast agent, is administered to the patient 26.

A vessel tracker 40 advantageously selectively tracks coronary arteries based on starting points supplied by an associated user 42 through a user interface 44, which is preferably interactive. As the vessel tracker tracks the vessels, key vessel-defining characteristics such as the vessel center and periphery information are stored in a vessel tree memory 46. A three-dimensional surface rendering processor 48 generates a 3-D representation, optionally rotatable, of the tracked vessel tree. The user interface 44 also permits selective viewing of the contents of the three-dimensional volume image memory 34, the output of the tracker 40, and the 3-D rendering. Further, the user interface 44 allows the user 42 to communicate with and direct the data acquisition controller 30 so that the user 42 can operate the CT scanner 10.

The apparatus embodiment of FIG. 1 is exemplary only. Those skilled in the art will be able to make modifications to suit particular applications. For example, the user interface 44 can include other components, such as printers, network connections, storage units, and the like (not shown), to facilitate efficient manipulating of the CT scanner 10. In another embodiment, the user interface 44 is a computer and vessel tracker 40 is a software component residing thereon.

Figure 2:
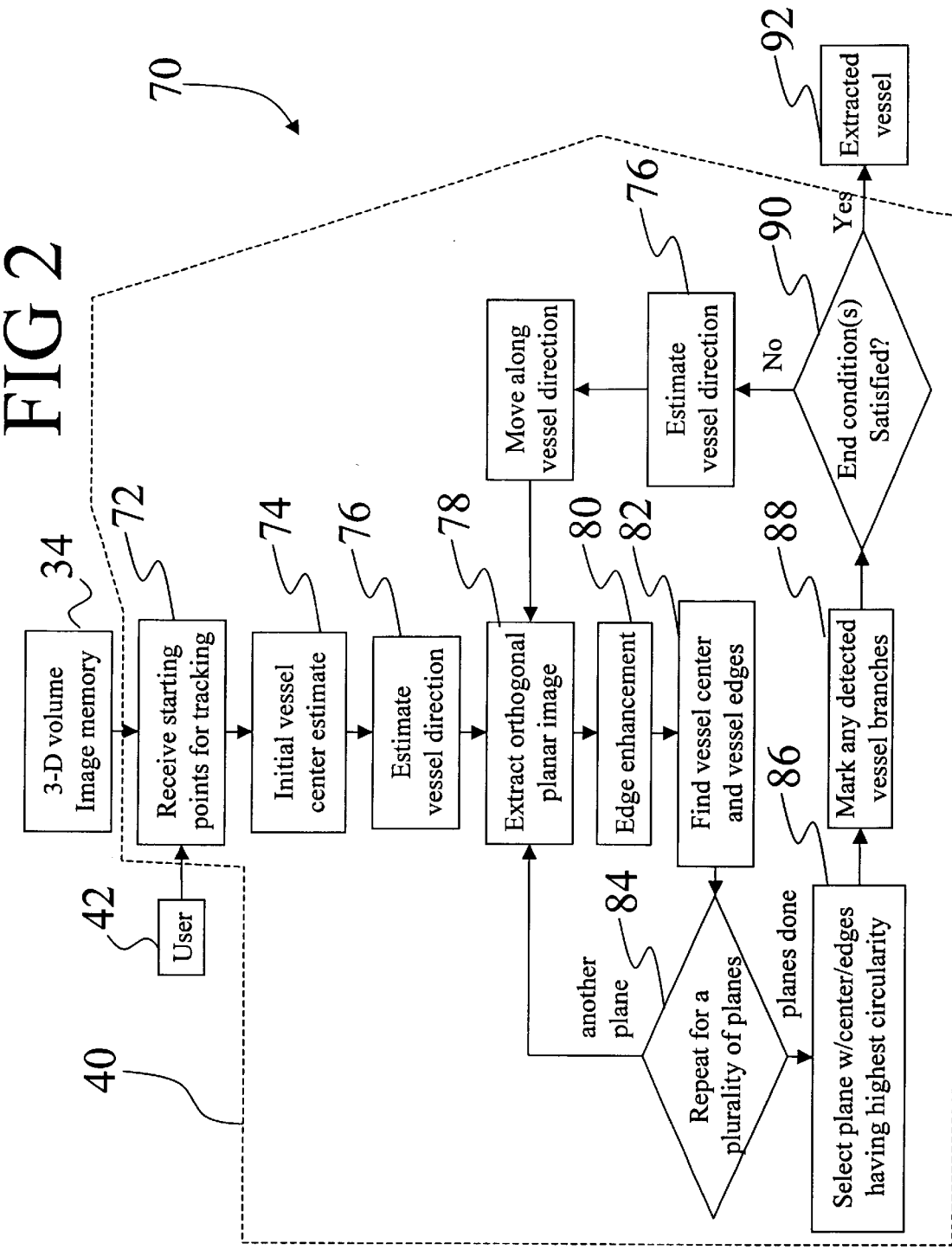
FIG. 2 schematically shows an exemplary method implemented by the vessel tracker of FIG. 1.

With continuing reference to FIG. 1 and with further reference to FIG. 2, an exemplary vessel tracking method 70 embodiment is described. The user 42 is interrogated via the user interface 44 and supplies one or more starting points or landmarks 72 within the three-dimensional volume image memory 34. One of the starting points 72 serve as an initial vessel center estimate 74.

A vessel direction is estimated 76 by extrapolating from at least two vessel center points. The vessel center points are supplied recursively, i.e. corresponding to previously identified vessel centers. To initiate the tracking direction, the starting points 72 can be used. In one embodiment, at least three points are used to extrapolate by fitting the points to a spline curve or other suitable curved linear function. In another embodiment, two points are taken at a time and the centerline is tracked between them. To avoid erroneously following a sharp turn corresponding to a branch, an end point is also supplied to indicate the principle vessel direction. Another method for avoiding inadvertently following branches is to weight the points used to bias against sharp curving. In yet another suitable embodiment, the vessel direction is obtained by line filtering a finite volume, extracting an inertia matrix, and performing an Eigen analysis of the inertia matrix to yield a vessel direction.

With continuing reference to FIGS. 1 and 2, a normal planar image that is orthogonal to the vessel direction is extracted 78 from the 3-D volume image of memory 34. The size of this plane can be varied based on the size of the vessel being tracked, but in any event it should be at least large enough to contain the entire vessel cross-section. The appropriate orthogonal plane is identified by transforming a plane parallel to the x-y plane into the orthogonal orientation according to:

$$\Upsilon = \arctan\left(\frac{n_y}{n_x}\right), \quad \Phi = \arctan\left(\frac{n_z}{\sqrt{n_x^2 + n_y^2}}\right) \qquad (1),$$

where $(n_x, n_y, n_z)$ is the directional normal along the vessel direction 76, $\gamma$ is the angle of the plane with respect to the z-axis, and $\phi$ is the angle of the plane with respect to the y-axis. The transformed coordinates are used to tri-linearly interpolate the image voxels from the 3-D volume image 34.

With the orthogonal plane found, the vessel center and the vessel boundaries are identified within the plane 78. Boundary identification is complicated by the low signal-to-noise ratio typically associated with multi-slice CT image data. To improve the boundaries' detectability, an edge enhancement 80 is preferably performed. In one embodiment, a Gaussian function convolutional smoothing is applied prior to computing directional component magnitudes to determine the presence of edges. Optionally, these edges can be superimposed onto the image in the display portion of the user interface 44 and the user 42 prompted to visually verify the edge identification. The edge enhancement just described is exemplary only, and other edge enhancement algorithms known to the art can instead be employed.

The edge enhanced planar image 80 is analyzed to find the vessel center and boundaries 82. In an exemplary embodiment, a central measure map is used for this analysis, as will be described in more detail later.

Those skilled in the art will recognize that the accuracy of the vessel centers and boundaries estimation 82 will depend upon the orthogonality of the planar image 80 relative to the actual vessel direction. Since the vessel direction 76 is only an estimate, in one preferred embodiment the vessel plane extraction 78, edge enhancement 80, and vessel center/edges analysis 82 are repeated 84 for a small plurality of planes at several tilts about the estimated vessel direction 76. For example, five planes are analyzed, one exactly orthogonal to the estimated direction 76, two other planes with tilts of 35 θ degrees about a selected relative "x" axis, and two additional planes with tilts of ±θ degrees about the corresponding orthogonal "y" axis. Since for an ideal cylindrical vessel the orthogonal plane will have vessel boundaries which is perfectly circular, that orthogonal plane of the small plurality of planes which has the most circular vessel boundary is selected 86.

In the course of the center and boundaries analysis 82, vessel branching may be detected. If so, vessel branches are advantageously marked 88 for possible later tracking. In this way, the tracker can be applied recursively to track an entire branched vascular tree.

Once the vessel center and boundaries are found, the process recursively iterates until a termination condition is satisfied 90. Suitable termination conditions optionally include, but are not limited to, actual termination of the vessel in the image, narrowing of the vessel below a pre-selected diameter, and an end point identified from among the starting points 72. The end result of the recursive method is the extracted vessel 92.

Figure 3:
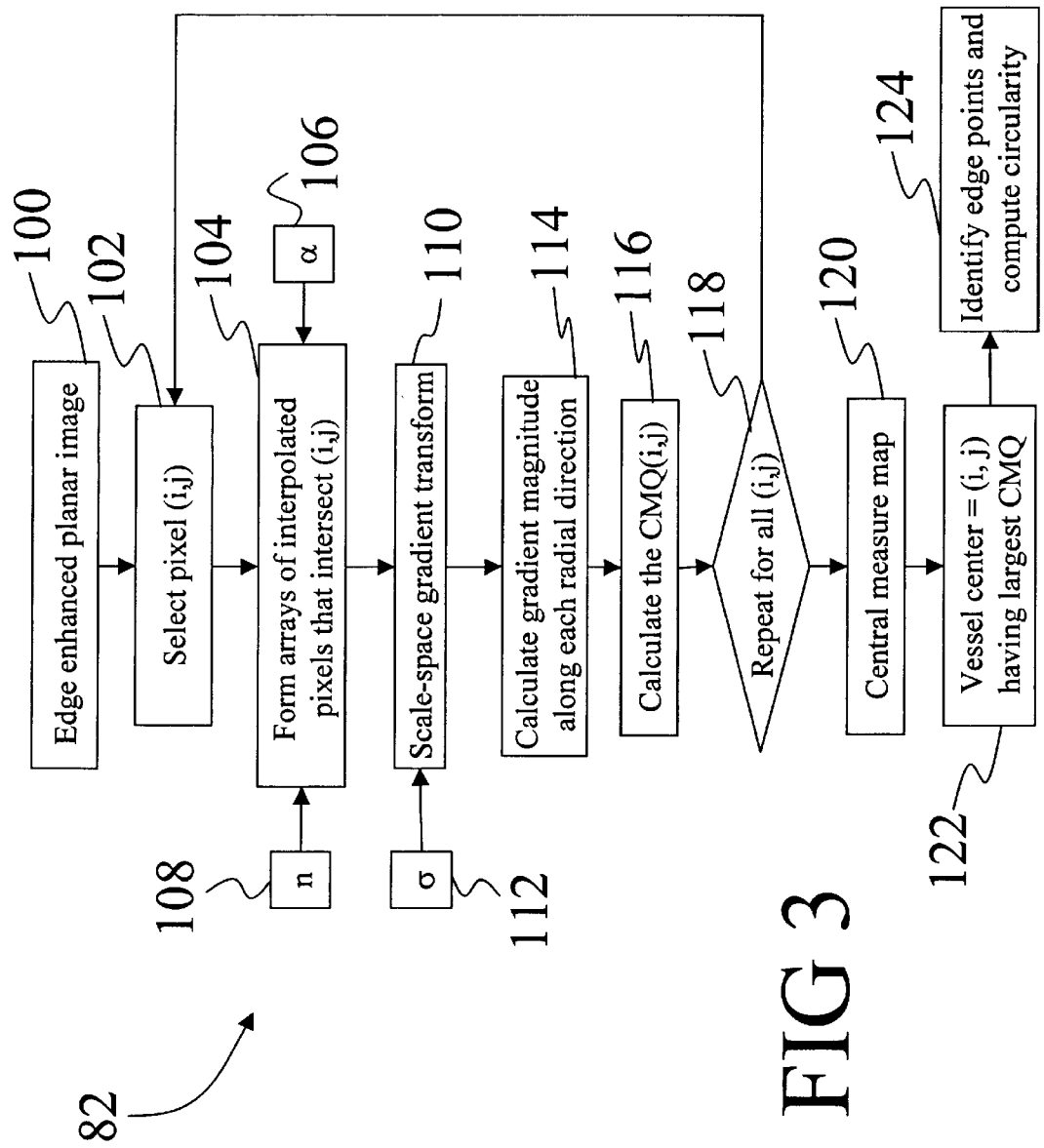
FIG. 3 shows an exemplary embodiment of the vessel center and edges processor.

With continuing reference to FIG. 2 and with further reference to FIG. 3, a suitable embodiment of the vessel center and edge analysis is described. The analysis is performed in the edge enhanced planar image 100 output by the edge enhancement processor 80. A central measure map is computed as follows.

Figure 4:
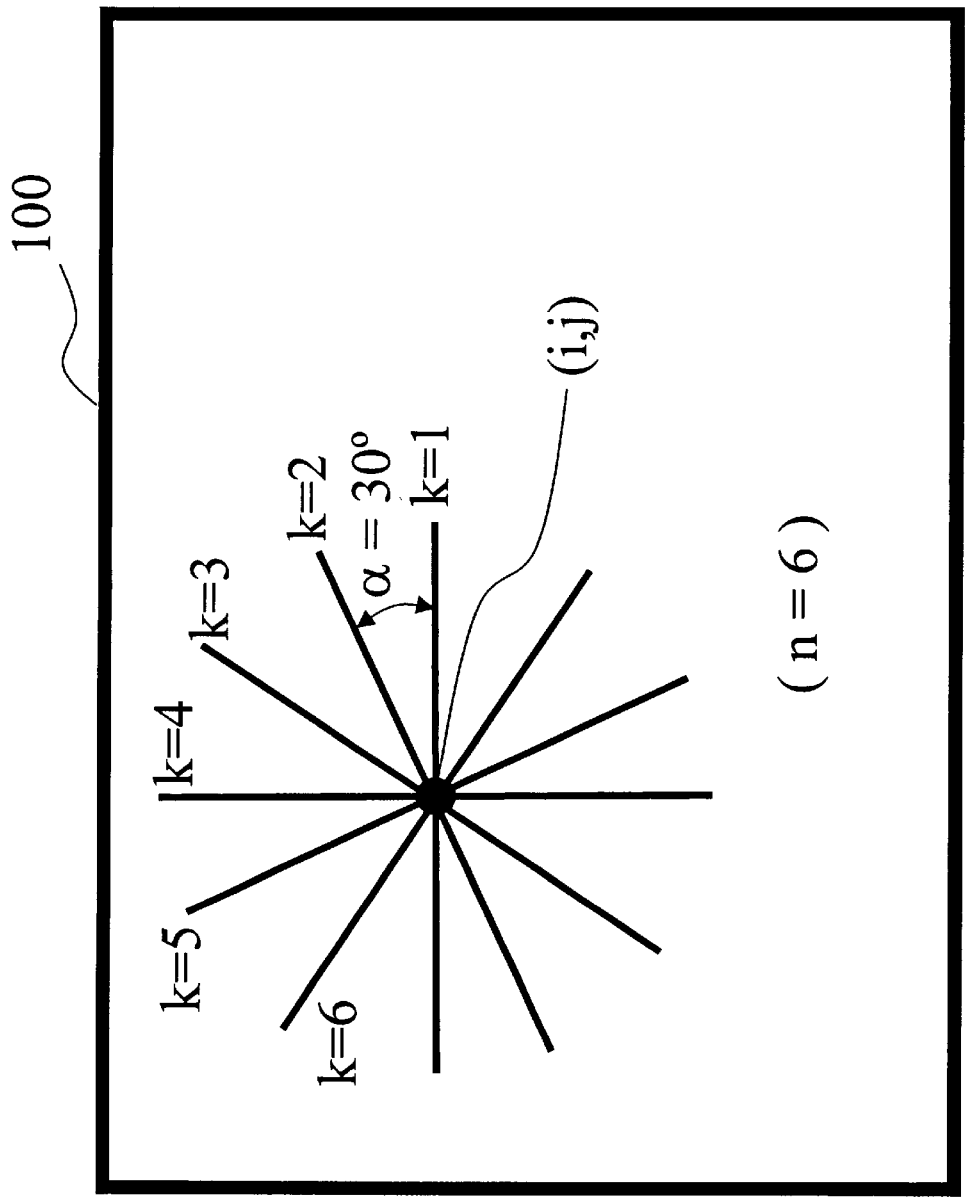
FIG. 4 shows an exemplary distribution of rays for use in conjunction with the constructing the central measure map.

With reference to FIG. 3 and with further reference to FIG. 4, for a pixel (i,j) 102, a plurality of rays are generated 104 which pass through the point (i,j) 102 at a selected angular separation α106 so that there are n 108 rays generated. In the exemplary FIG. 4 where a α=30°, there are n=6 rays indexed by k which radially span about the point (i,j) 102.

For each ray, the gradient is computed 110 by convolving with a gaussian derivative kernel according to:

$$\nabla R(\vec{r},\sigma) = I(\vec{r}) * \sigma^{\gamma} \nabla G(x,\sigma) \qquad (2),$$

where $\vec{r}$ = ray, $I(\vec{r})$ = image array, and $\sigma^{\gamma} \nabla G(x,\sigma)$ = the gaussian derivative kernel where σ is the gaussian variance which serves as a scale factor 112 in the method and is selected based on the size or diameter of the vessel being tracked. Those skilled in the art will recognize that for larger scale factors only the dominant edges will be present after the gradient transform. The factor γ in equation (2) is a normalizing factor corresponding to Lindeberg's power constant which preserves the image characteristics across the gradient transform. G(x,σ) is the well known Gaussian function given by:

$$G(x, \sigma) = \frac{1}{2\pi\sigma^2} e^{\frac{-x^2}{2\sigma^2}} \qquad (3),$$

and the derivative of the gaussian, defined as:

$$\nabla G(x, \sigma) = \frac{\partial}{\partial x} G(x, \sigma) \qquad (4),$$

is computed using a three-point difference operation, i.e. convolving with a {1, 0, −1} kernel.

A gradient magnitude is calculated 114 along the radial direction according to:

$$\frac{\partial R_{1,2}}{\partial \vec{r}_{1,2}} = \left( \frac{|\nabla R(\vec{r}, \sigma)|}{|\vec{r}|} \right)_{\vec{r}_{1,2} = \text{first maximums}} \qquad (5),$$

where the subscripts 1,2 refer to the positive and negative directions along the linear image array I(r) and the magnitude of the vector r reaches to the first maximum in the transformed radial array. The central measure map is then generated 116 by transforming each pixel (i,j) 102 according to the transformation:

$$CMQ(i, j) = \frac{1}{n} \sum_{k=1}^{n} \left( \frac{\min\left\{\frac{\partial R_1}{\partial \vec{r}_k}, \frac{\partial R_2}{\partial \vec{r}_k}\right\}}{\max\left\{\frac{\partial R_1}{\partial \vec{r}_k}, \frac{\partial R_2}{\partial \vec{r}_k}\right\}} \right) \qquad (6).$$

The CMQ function is indicative of how well centered the point (i,j) is within its surrounding edge boundaries. The calculation of CMQ(i,j) is repeated 118 for each pixel (i,j) 102 to produce the central measure map 120. The vessel center is selected 122 as the point (i,j) having the largest central measure map value CMQ(i,j). Generally, the vessel center will have CMQ close to 1.0 for circular and elliptical borders, with decreases therefrom as vessel edge irregularities increase. With the center selected 122, the edge points are selected 124 as the $r_{1,2}$ vectors of equation (5), and a circularity is estimated therefrom since for perfect circularity the $r_{1,2}$ vectors are all equal at the vessel center.

Figures 5, 5A:
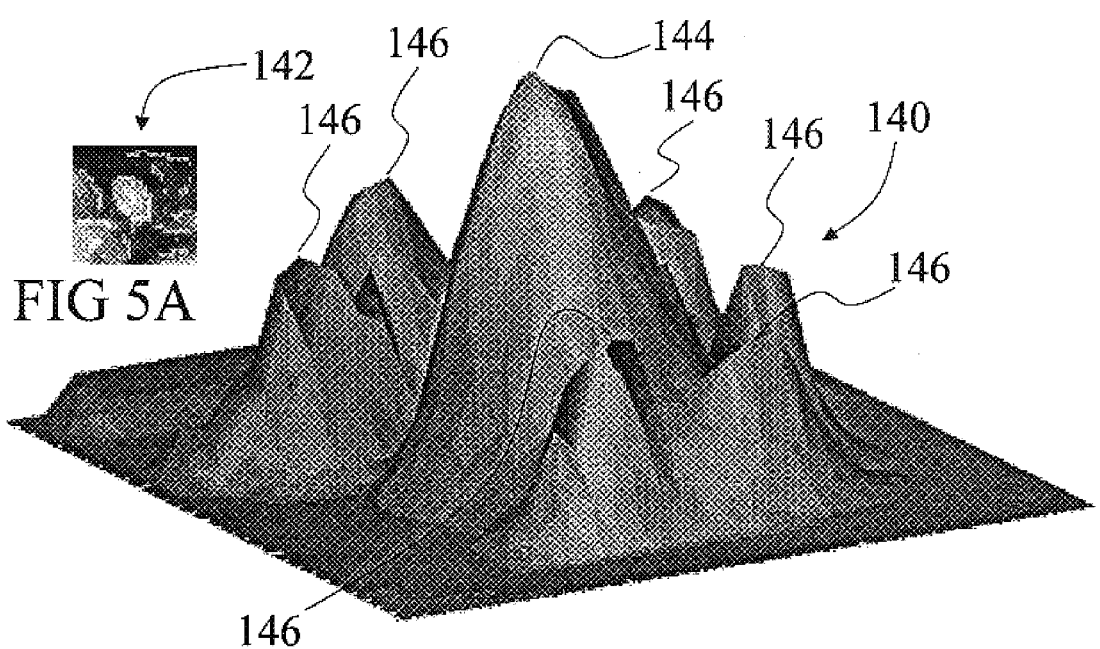
FIG. 5 shows an exemplary central measure map.
FIG. 5A show in inset form the image slice corresponding to the central measure map of FIG. 5.

With reference to FIG. 5, an exemplary central measure map 140 is shown, along with an inset FIG. 5A of the corresponding image slice 142. The vessel center 144 is identified as the largest value of the central measure map. Additional peaks 146 are also seen in the central measure map, and these correspond to smaller nearby vessels which are also discernable in the inset image slice 142. Those skilled in the art will recognize that at a vessel branch there will be a merging of the central measure map peaks of the main vessel and the smaller branch coming off. Such a merging can be detected to facilitate marking of branches 88 (FIG. 2). The tracking system 70 can then be successively applied to each marked branch to recursively track the full vascular tree.

Figure 6:
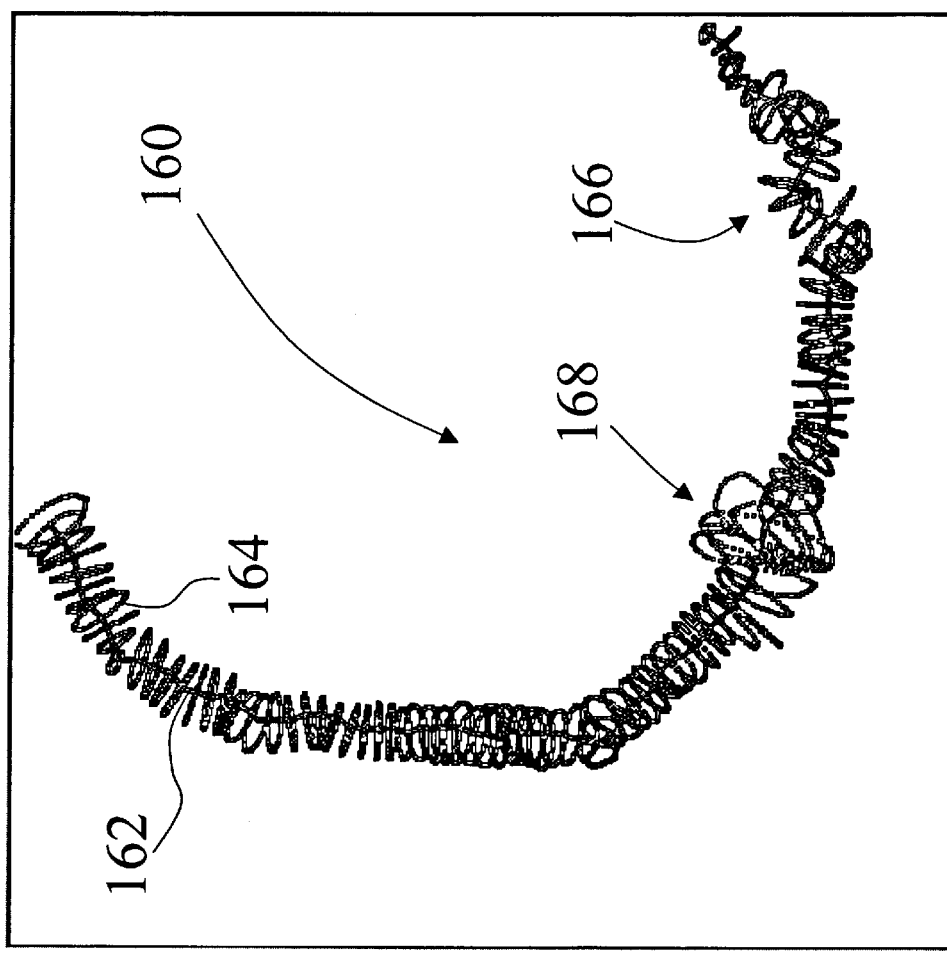
FIG. 6 shows an exemplary three-dimensional rendering of a vessel tracked in accordance with the method of FIG. 2.

With reference to FIG. 6, an exemplary three-dimensional rendering of a tracked vessel 160 is shown, rendered by a centerline 162 formed in three dimensions by connecting the identified vessel center of each orthogonal plane, and by a plurality of two dimensional vessel edge contours 164 situated in three dimensional space which correspond to the vessel boundaries of the plurality of orthogonal planes. A sharp bend 166 in the vessel was properly tracked, and a widened structure 168, which could be an aneurysm, vessel branch point, or the like, is also detected. Of course, the tracked vessel can also be rendered using other methods, such as a shaded three-dimensional representation, a projection, or the like.

Figure 7:
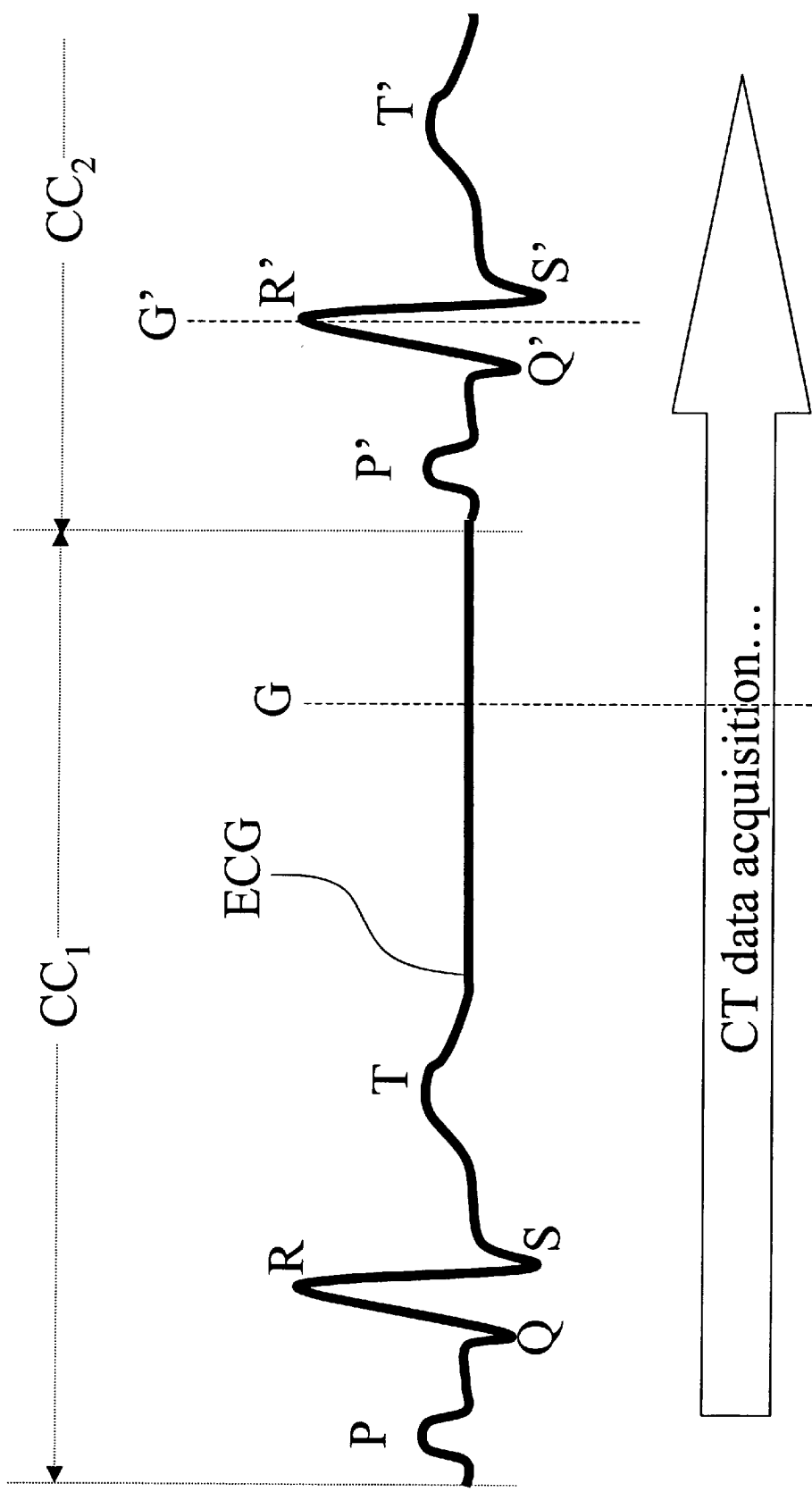
FIG. 7 schematically shows another embodiment wherein the tracking system is used to optimize the retrospective gating phase.

With reference returning to FIG. 1 and with further reference to FIG. 7, another application of the present invention is described, wherein the tracking provides a method for determining optimal phasing in retrospective CT gating. The electrocardiograph 50 (FIG. 1) records an electrocardiogram ECG as shown schematically in FIG. 7. A first cardiac cycle $CC_1$ is shown in full, with several conventionally recognized points in the electrocardiogram ECG labeled: namely the atrial depolarization P, ventricular depolarization Q, R, S, and ventricular repolarization T. A second cardiac cycle $CC_2$ with points P', Q', R', S', T' labeled is shown in part. The phasing of the retrospective CT gating is indicated as G. As indicated below the ECG, multi-slice CT data acquisition occurs continuously during the cardiac cycling. After acquisition, the CT data is analyzed using retrospective gating which employs the phasing G as a temporal reference by which data acquired across cardiac cycles is synchronized. For a non-optimal phase G selection, the tracking is less effective and often even fails completely. Thus, by performing tracking for a range of phases G of the retrospective gating, the optimal phase is selected based on the success and quality of the vessel tracking.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

What is claimed is:

1. A method for tracking a blood vessel in a three-dimensional image, the method comprising:
   identifying an estimated vessel center corresponding to a starting point lying within a vessel to be tracked;
   estimating a vessel direction in the vicinity of the starting point;
   extracting a planar image containing the estimated vessel center from the three-dimensional image, which planar image is perpendicular to the estimated vessel direction;
   edge-enhancing the planar image;
   locating a corrected vessel center in the planar image;
   finding vessel boundaries in the planar image;
   extrapolating a new estimated vessel center along the vessel direction; and
   recursively repeating the estimating, extracting, edge-enhancing, locating, finding, and extrapolating steps to track the vessel.

2. The method as set forth in claim 1, wherein the estimating of a vessel direction includes:
   fitting a curve to a plurality of previous vessel centers.

3. The method as set forth in claim 1, wherein the estimating of a vessel direction includes:
   fitting a curve to a plurality of previous vessel centers which are weighted to bias against sharp curving.

4. The method as set forth in claim 1, wherein the estimating of a vessel direction includes:
   line filtering the finite volume;
   extracting an inertia matrix from the filtered volume; and
   performing an Eigen analysis of the inertia matrix to estimate a vessel direction.

5. The method as set forth in claim 1, wherein the locating of a corrected vessel center in the planar image includes:
   computing a central measure function; and
   selecting the corrected vessel center as a pixel of the planar image having a maximum central measure function.

6. The method as set forth in claim 5, wherein the computing of a central measure function includes:
   extracting a plurality of linear arrays of interpolated pixels which intersect a selected pixel;
   transforming the linear arrays by convolving with a gaussian derivative;
   identifying first maximum values in positive and negative directions along the linear arrays;
   calculating a merit function based on the transformed linear arrays which is indicative of how well centered the point (i,j) is within its surrounding edge boundaries; and
   repeating the extracting, transforming, and calculating for a plurality of selected pixels.

7. The method as set forth in claim 6, wherein the finding of vessel boundaries in the planar image includes:
   identifying vessel boundaries as the first maximum values for the selected vessel center.

8. The method as set forth in claim 1, wherein the finding of vessel boundaries in the planar image includes:
   extracting a plurality of linear arrays of interpolated pixels which intersect the vessel center; and
   identifying vessel edges in positive and negative directions along each linear array.

9. The method as set forth in claim 8, further including:
   during the identifying of vessel edges, marking vessel edges indicative of vessel branching;
   recursively repeating the vessel tracking at each marked vessel branch; and
   combining the tracked vessels to form a vessel tree.

10. A medical imaging method comprising:
    collecting volume imaging data;
    reconstructing at least a portion of the imaging data to form a volume image;
    identifying at least one starting point within a blood vessel imaged in the three-dimensional image volume; and
    recursively tracking the blood vessel to form a blood vessel representation, the recursive tracking including:
       estimating a vessel direction in the vicinity of the starting point,
       extracting a planar image containing the vessel center from the three-dimensional image, which planar image is perpendicular to the estimated vessel direction,
       edge-enhancing the planar image,
       locating a vessel center in the planar image,
       finding vessel boundaries in the planar image,
       extrapolating a new estimated vessel center along the vessel direction, and
       recursively repeating the estimating, extracting, edge-enhancing, locating, finding, and extrapolating steps to track the vessel.

11. The method as set forth in claim 10, wherein the estimating of a vessel direction includes:
    fitting a curve to a plurality of previous vessel centers.

12. The method as set forth in claim 10, wherein the locating of a vessel center in the planar image includes:
    computing a central measure function; and
    selecting a vessel center as a pixel of the planar image having a maximum central measure function.

13. The method as set forth in claim 10, wherein the finding of vessel boundaries in the planar image includes:
    extracting a plurality of linear arrays of interpolated pixels which intersect the vessel center; and identifying vessel edges in positive and negative directions along each linear array.

14. An imaging method comprising:

reconstructing imaging data to form a volume image;

identifying at least one starting point within a blood vessel imaged in the three-dimensional image volume;

recursively tracking the blood vessel to form a blood vessel representation;

during the tracking, marking vessel edges indicative of vessel branching;

recursively repeating the vessel tracking at each marked vessel branch; and combining the tracked vessels to form a vessel tree.

15. A medical imaging method comprising:

collecting computed tomography (CT) data for a plurality of slices over a plurality of cardiac phases;

selecting a portion of CT data for reconstruction using retrospective gating to select one of the cardiac phases;

reconstructing the selected portion of the imaging data to form a volume image defined by a plurality of two-dimensional image slices;

identifying at least one starting point within a blood vessel imaged in the three-dimensional image volume; and recursively tracking the blood vessel to form a blood vessel representation.

16. The method as set forth in claim 15, further including:

selecting portions of the CT data using retrospective gating corresponding to a range of the cardiac phases; and selecting the optimal cardiac phase based on the recursive tracking.

17. An apparatus for tracking one of a blood vessel and a tubular organ in a patient, the apparatus including a tracking processor for tracking the blood vessel or tubular organ in the three-dimensional image representation by performing a recursive tracking method, the tracking method including:

selecting a starting point;

estimating a vessel or tubular organ direction at the starting point;

extracting an image plane orthogonal to the estimated direction and containing the starting point;

determining at least one of a vessel or tubular organ center and vessel or tubular organ edges in the image plane;

identifying a new point based on the estimated direction; and from the new point, repeating the estimating, extracting, determining, and identifying a plurality of times to effectuate the tracking.

18. An apparatus for tracking one of a blood vessel and a tubular organ in a patient, the apparatus comprising:

a computed tomography scanner for acquiring three-dimensional image data;

a reconstruction processor for reconstructing the three-dimensional image data into a three-dimensional image representation;

a means for estimating a vessel direction at a user selected starting point;

a means for extracting an image plane orthogonal to the vessel direction and containing the starting point;

a means for determining at least one of a vessel center and vessel edges in the image plane;

a means for identifying a new point based on the estimated vessel direction; and a means for the estimating, extracting, determining, and identifying being repeated a plurality of times to effectuate the tracking.

* * * * *